(12) United States Patent
Lee et al.

(10) Patent No.: US 7,773,126 B1
(45) Date of Patent: Aug. 10, 2010

(54) MOSAIC IMAGE COLLECTOR INCLUDING AN EMBEDDED ATOMIC CLOCK

(75) Inventors: Paul P. Lee, Pittsford, NY (US); Kenneth R. Gardner, Rochester, NY (US); Fred Yacoby, Honeoye Falls, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 451 days.

(21) Appl. No.: 11/441,936

(22) Filed: May 26, 2006

(51) Int. Cl.
*H04N 5/76* (2006.01)

(52) U.S. Cl. ............... 348/231.5; 348/36; 348/159; 348/239; 382/284; 382/294

(58) Field of Classification Search ............. 348/36, 348/38, 143, 144, 145, 147, 159, 231.5, 239; 382/284, 294
See application file for complete search history.

(56) References Cited

U.S. PATENT DOCUMENTS

| | | | | |
|---|---|---|---|---|
| 5,394,486 | A * | 2/1995 | Eisenbarth et al. | 382/309 |
| 5,596,494 | A * | 1/1997 | Kuo | 702/2 |
| 5,642,285 | A * | 6/1997 | Woo et al. | 701/213 |
| 6,233,523 | B1 * | 5/2001 | Sood | 701/213 |
| 6,236,623 | B1 * | 5/2001 | Read et al. | 368/46 |
| 6,317,508 | B1 * | 11/2001 | Kramer et al. | 382/124 |
| 6,711,283 | B1 * | 3/2004 | Soenksen | 382/133 |
| 6,788,333 | B1 | 9/2004 | Uyttendaele et al. | |
| 6,834,128 | B1 | 12/2004 | Altunbasak et al. | |
| 6,842,190 | B1 * | 1/2005 | Lord et al. | 348/231.5 |
| 6,847,691 | B2 * | 1/2005 | Torikoshi et al. | 375/354 |
| 7,133,068 | B2 * | 11/2006 | Fisher et al. | 348/218.1 |
| 7,142,066 | B1 * | 11/2006 | Hannah et al. | 331/94.1 |
| 7,194,112 | B2 * | 3/2007 | Chen et al. | 382/106 |
| 7,256,825 | B2 * | 8/2007 | Lord et al. | 348/231.5 |
| 7,312,821 | B2 * | 12/2007 | Voss et al. | 348/220.1 |
| 7,403,224 | B2 * | 7/2008 | Fuller et al. | 348/231.3 |
| 7,428,324 | B2 * | 9/2008 | Crandall et al. | 382/128 |
| 7,430,682 | B2 * | 9/2008 | Carlson et al. | 713/500 |
| 7,526,718 | B2 * | 4/2009 | Samadani et al. | 715/201 |
| 2002/0054223 | A1 * | 5/2002 | Spriggs | 348/232 |
| 2004/0151479 | A1 * | 8/2004 | Ogikubo | 386/117 |
| 2005/0100200 | A1 * | 5/2005 | Abiko et al. | 382/124 |
| 2005/0104976 | A1 * | 5/2005 | Currans | 348/231.5 |
| 2005/0111701 | A1 * | 5/2005 | Seki et al. | 382/107 |
| 2007/0247477 | A1 * | 10/2007 | Lowry et al. | 345/629 |

OTHER PUBLICATIONS

Bryan Ackland and Alex Dickson, "Camera on a Chip", IEEE International Solid State Circuits Conference, 1996.*

* cited by examiner

*Primary Examiner*—Lin Ye
*Assistant Examiner*—Chriss S Yoder, III
(74) *Attorney, Agent, or Firm*—RatnerPrestia

(57) ABSTRACT

An imaging system includes a camera having a lens and a focal planar array (FPA) for capturing at least one image frame having a plurality of sub-image frames. Each sub-image frame includes multiple pixel values corresponding to photonic intensities of the captured image frame. An embedded atomic clock (EAC) is integrated in one single unit with the camera for providing time code data. A multiplexer combines the multiple pixel values of one sub-image frame with the time code data, and an input/output module provides both, the time code data and the multiple pixel values of the sub-image frame as an output data stream.

13 Claims, 6 Drawing Sheets

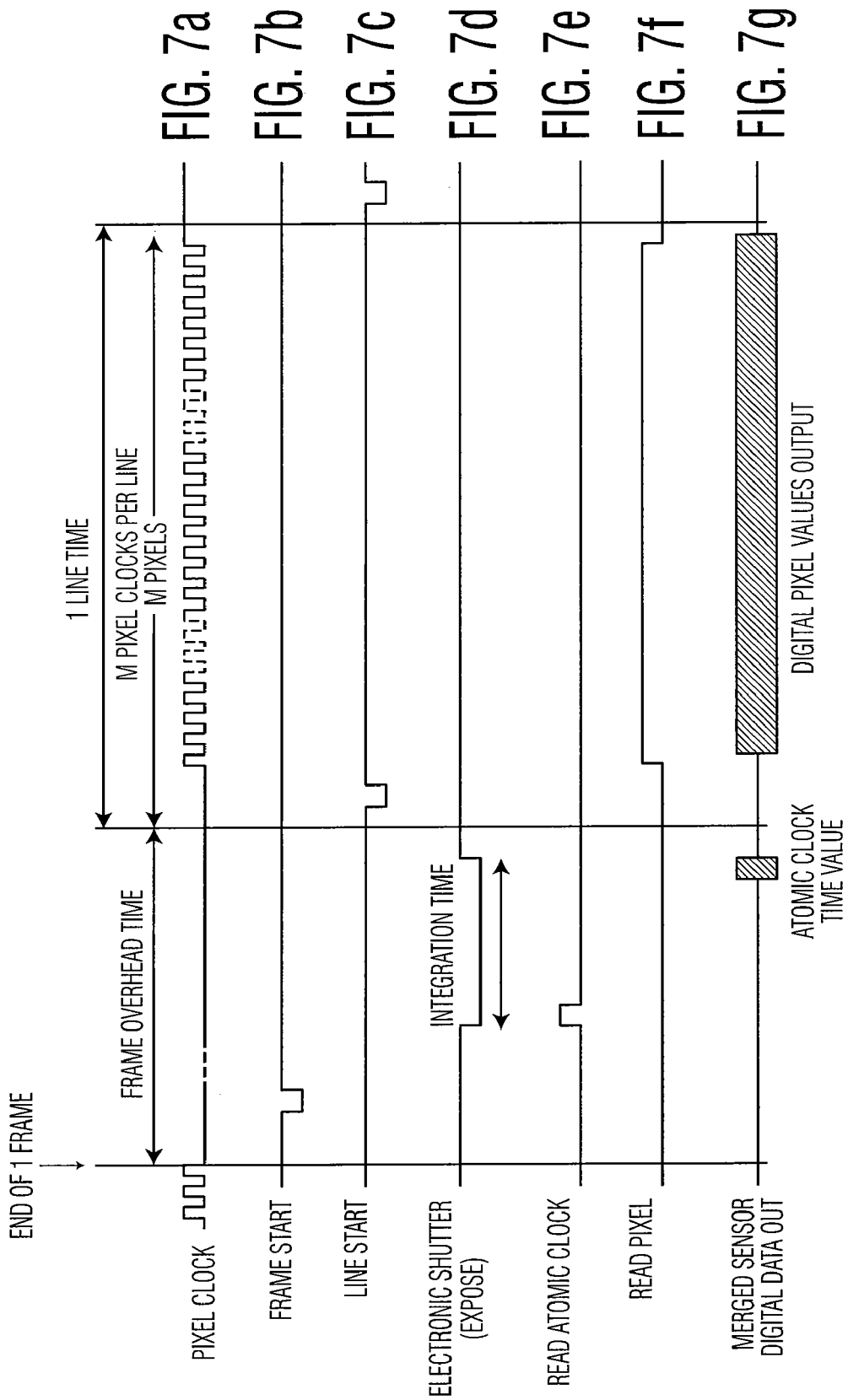

MOSAIC IMAGE COLLECTOR INCLUDING AN EMBEDDED ATOMIC CLOCK

TECHNICAL FIELD

The present invention relates, in general, to imaging techniques and, more specifically, to an image capture and processing system that includes an embedded atomic clock to enable, for example, image mosaicing.

BACKGROUND OF THE INVENTION

Image mosaicing involves stitching together multiple separate sets of image information to create a composite still image. In particular, image mosaicing involves stitching together frames of digital image information that are captured by digital still cameras or digital video cameras. Image mosaicing is often utilized to generate a single panoramic image from a series of individual images.

The process of generating a high-quality image mosaic requires large digital storage and processing capacity. In order to provide the storage and processing capacity needed to create a high-quality image mosaic, a still or video digital camera can be connected to a computer equipped with an image mosaicing application. Image information captured by the digital camera is provided directly from the digital camera to the computer and stitched together by the mosaicing application into an image mosaic. The image mosaic generated by the computer can be viewed on a display, printed, edited, and/or permanently stored.

Prior art collection of mosaic images, covering an area larger than a single field of view during remote sensing, records the time of the image snap shot at the instance the command to capture the image is issued and processed by the imaging computer. This time stamp information is typically stored in a database or encoded in the image meta-data (file record) after the image is transferred to the imaging computer or transferred to file storage.

In a situation where a large area image is a mosaic of images collected at different instances of time and collected from different platforms, such as a constellation of remote sensing satellites, precise time information is compromised by the latency occurring among the different satellites or platforms. There may be variable time delays between the expose command and the actual time an image snap-shot begins and ends. This makes processing and analysis, which are critically dependent on the time each mosaic tile image is captured, very difficult. For example, tracking movement of an object through a large mosaic, requires a large amount of processing power and storage capacity, because of latency considerations between mosaic tile images.

The present invention overcomes time issues due to imprecise time stamping of mosaic tiles, imprecise differences in image exposures between mosaic tiles, and imprecise differences in processing speeds between one tile and another tile.

SUMMARY OF THE INVENTION

To meet this and other needs, and in view of its purposes, the present invention provides an imaging system including a camera having a lens and a focal planar array (FPA) for capturing at least one image frame having a plurality of sub-image frames, wherein each sub-image frame includes multiple pixel values corresponding to photonic intensities of the captured image frame. An embedded atomic clock (EAC) is integrated in one single unit with the camera for providing time code data. A multiplexer combines the multiple pixel values of one sub-image frame with the time code data. An input/output module is integrated in the one single unit for providing both, the time code data and the multiple pixel values of the one sub-image frame as an output data stream. The input/output module includes an analog-to-digital converter (ADC) for outputting a digital data stream of both, the time code data and the multiple pixel values of the one sub-image frame. The input/output module is configured to output the digital data stream including an alternating sequence of the time code data and the multiple pixel values of a corresponding one sub-image frame of the plurality of sub-image frames.

In one embodiment, the EAC and the FPA are disposed within one single unit. The EAC and the FPA may also be disposed on one single substrate within the one single unit. The EAC may be an integrated circuit, or a chip-scale atomic clock. The time code data includes at least one time stamp, and the multiplexer is configured to combine the multiple pixel values of one sub-image frame with the at least one time stamp.

Another embodiment of the invention is an image mosaicing system including at least one camera having a lens and a focal planar array (FPA) for capturing at least one image mosaic having a plurality of image tiles. Each image tile includes multiple pixel values corresponding to photonic intensities of at least one captured image frame. An embedded atomic clock (EAC) is integrated in one single unit with the at least one camera for providing a plurality of time stamp data. Multiplexing means combines, in succession, one time stamp data of the plurality of time stamp data and one image tile of the plurality of image tiles, and outputs an interleaved sequence of time stamps and image tiles. Mosaicing means stitches together the outputted sequence of image tiles, based on the outputted sequence of time stamps. The image mosaicing system includes at least two cameras, each having a lens and a FPA for capturing at least two image mosaics, respectively. A respective EAC is separately integrated in one single unit with each of the cameras for separately providing a plurality of time stamp data. Respective multiplexing means separately combine, in succession, one time stamp data with one image tile captured by each of the at least two cameras. The mosaicing means is configured to receive each of the separately combined one time stamp data and one image tile from each of the at least two cameras, and stitch together a plurality of image tiles to form an image mosaic. The mosaicing means includes combining a plurality of image tiles from one of the cameras with another plurality of image tiles from at least another of the cameras.

The image mosaicing system of the present invention provides for the EAC and the FPA to be disposed within one single unit of the at least one camera. The EAC and the FPA are also disposed on one single substrate within the one single unit of the at least one camera.

Still another embodiment of the present invention includes a method of imaging an object. The method has the steps of:

(a) capturing a plurality of pixel values representing a plurality of image tiles using a FPA of at least one camera;

(b) receiving multiple time stamps from an EAC;

(c) combining, in alternating sequence, (1) the pixel values representing each of the image tiles captured in step (a) and (2) the multiple time stamps receives in step (b); and (d) outputting as a data stream, the combined alternating sequence of pixel values and time stamps.

The method also includes the step of:

(e) mosaicing the pixel values representing image tiles, based on the time stamps outputted in step (d).

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures:

FIGS. 7(a)-7(g) are timing diagrams showing the time synchronization of pixel data with time stamp data from an embedded atomic clock, in accordance with an embodiment of the present invention.

DETAILED DESCRIPTION OF THE INVENTION

Figure 1:
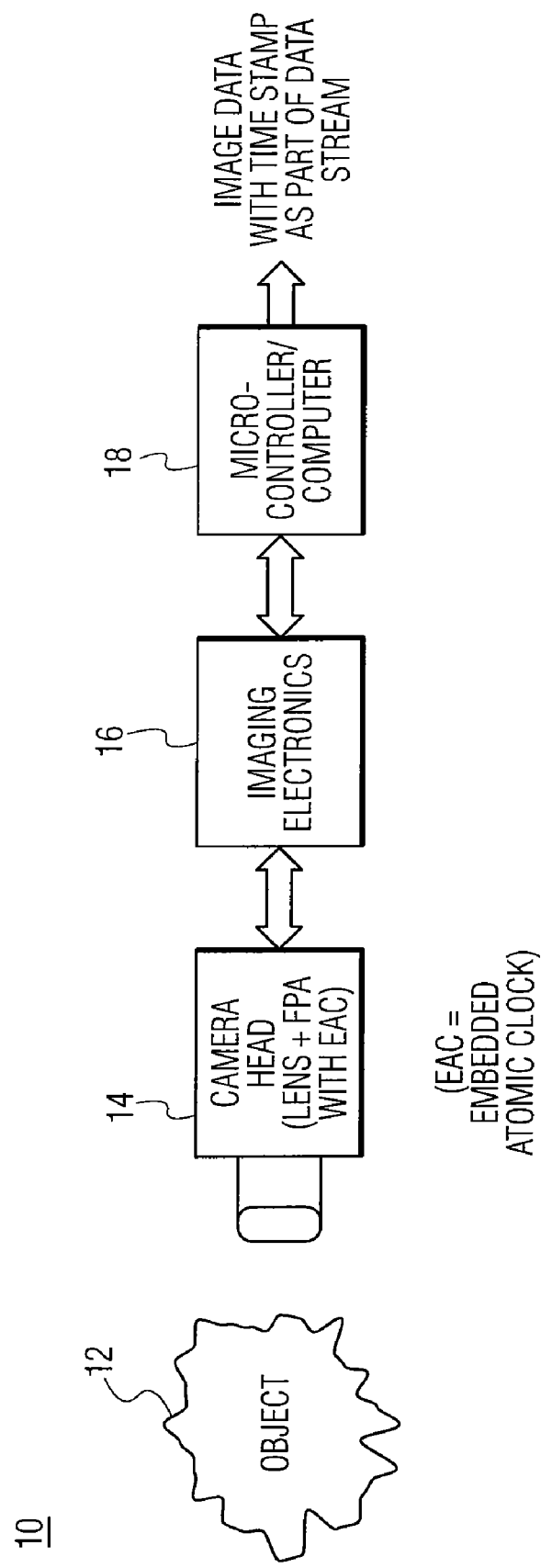
FIG. 1 is a block diagram of an imaging system including a camera having a focal planar array (FPA) and an embedded atomic clock (EAC), in accordance with an embodiment of the present invention.

Referring to FIG. 1 there is shown an imaging system, generally designated as 10. Imaging system 10 includes camera 14 for imaging a remote object, designated as 12. Imaging system 10 further includes imaging electronics 16 and microcontroller/computer/processor 18 for providing an image data stream that includes multiple time stamp data as an integral part of the image data stream.

As will be described, camera 14 includes a lens for imaging object 12 and a focal planar array (FPA) for receiving light (or photons) from the object and converting the light (or photons) into values having different intensities, based on detection by an array of pixels in the FPA. Also included in camera 14 is an embedded atomic clock (EAC) for providing accurate time stamp data, which are associated with the instances that the FPA detects the photons arriving from object 12.

The output of camera 14 is coupled to imaging electronics 16 by way of a data bus. Imaging electronics 16 may include, for example, an analog-to-digital converter (ADC) for converting analog intensities detected by the array of pixels of the FPA into digital image data. As shown, imaging electronics 16 is coupled by way of another data bus to microcontroller/computer/processor 18. Microcontroller/processor/computer 18 combines the digital image data with time stamp data from the EAC to form a combined output data stream. The combined output data stream may be sent to a storage device (not shown) or to another computer (not shown) for further processing.

It will be appreciated that although the imaging system of FIG. 1 includes three separate modules, it is contemplated within the scope of the present invention that all of the modules, or some of the modules may be integrated into a single unit.

Figure 2:
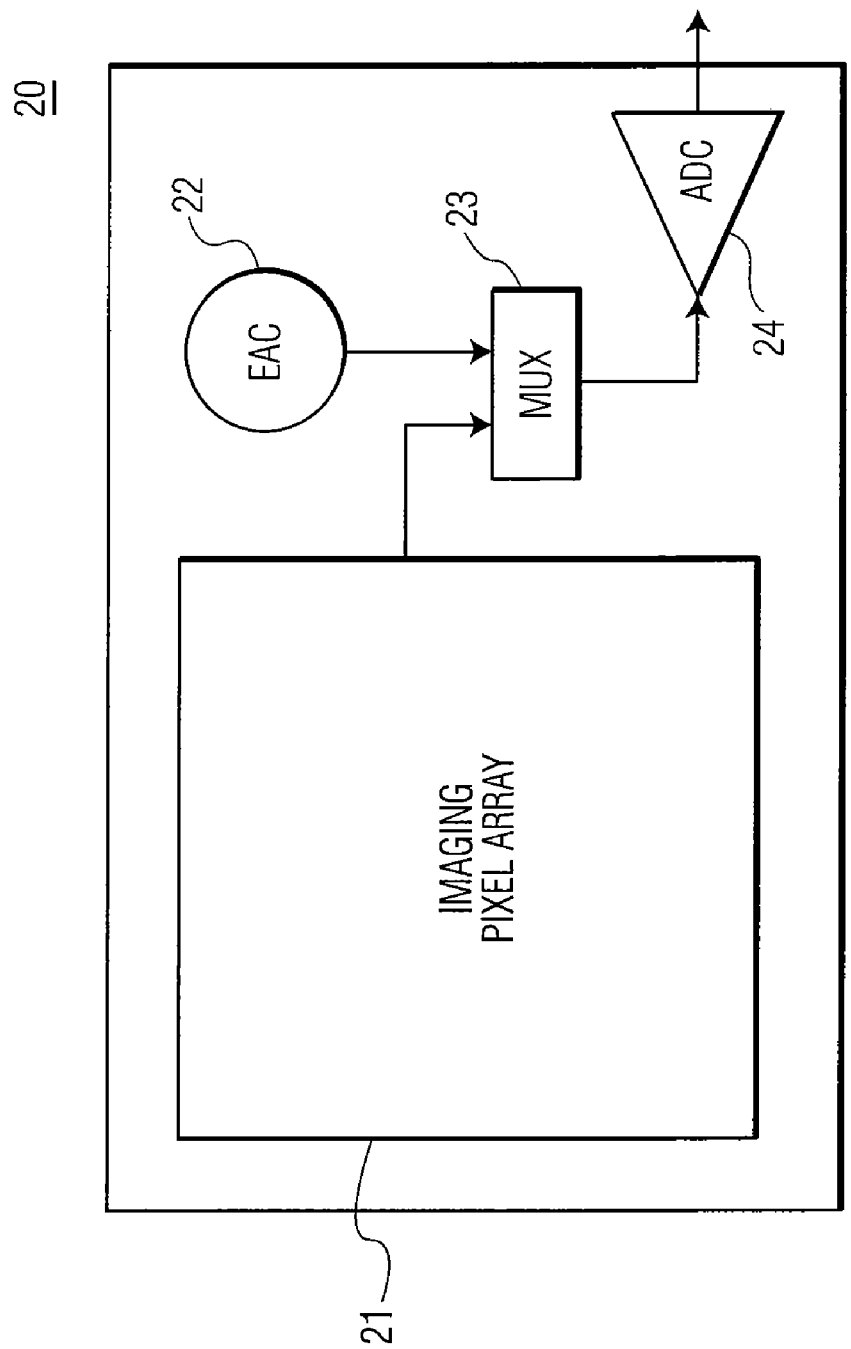
FIG. 2 is a pictorial block diagram showing a portion of an imaging system including an imaging pixel array and an embedded atomic clock, in accordance with an embodiment of the present invention.

Referring next to FIG. 2, there is shown another embodiment of a portion of an imaging system, generally designated as 20. As shown, imaging system 20 includes imaging pixel array 21 and embedded atomic clock (EAC) 22. The output pixel intensities from imaging pixel array 21 and the time stamp signals from EAC 22 are combined by multiplexer 23. The output signal from multiplexer 23 includes multiple values of pixel intensities that are interleaved with multiple values of time stamp signals. As shown, the multiple values of time stamp signals are assumed to be analog signals. The analog signals from imaging pixel array 21 and the analog signals from EAC 22 are combined by multiplexer 23.

The output signal from multiplexer 23 is provided to ADC 24. The analog intensities sensed by imaging pixel array 21 and the analog time stamp signals are converted into a digital data stream. The output digital data stream from ADC 24 includes data fields of time code data alternating with a predetermined set of digital pixel values.

Figure 3:
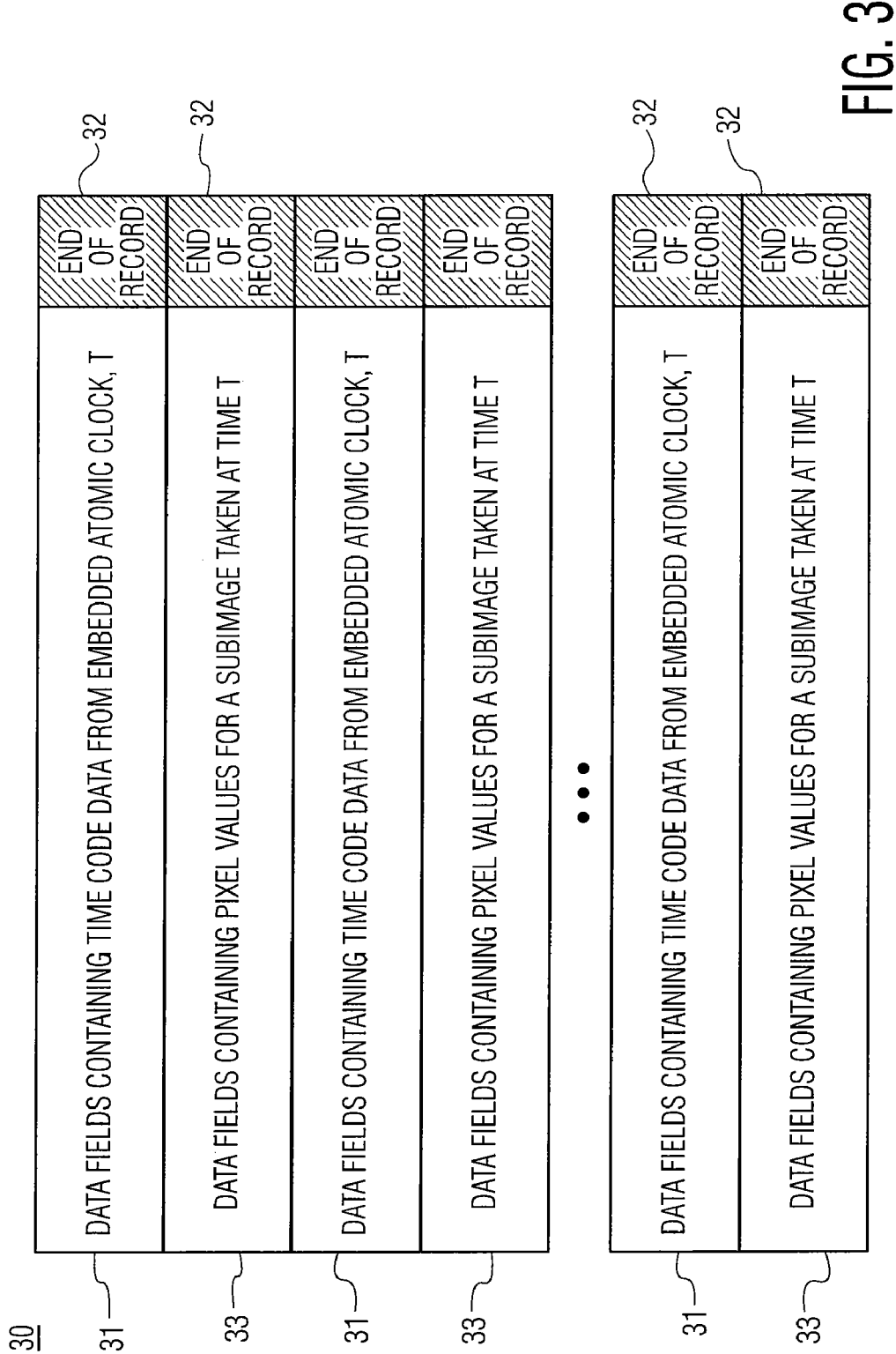
FIG. 3 is an exemplary data stream including fields of pixel values that are time multiplexed with time code data generated from an embedded atomic clock, in accordance with an embodiment of the present invention.

Referring next to FIG. 3, there is shown an exemplary data stream, generally designated as 30, which is provided by an imaging system of the present invention. The data stream includes alternating fields of data. In the sequence shown, first there are data fields containing time code data, generally designated as 31, and next there are data fields containing pixel values for a sub-image, generally designated as 33. The end of each data field 31, 33 is indicated by an end of record (EOR), generally designated as 32.

It will be understood that sub-image, as used herein, refers to a predetermined number of rows of pixel data, for example a quarter-frame of pixel data or a half-frame of pixel data. The predetermined number of rows of pixel data may also include a complete-frame or a mosaic tile.

Figure 4:
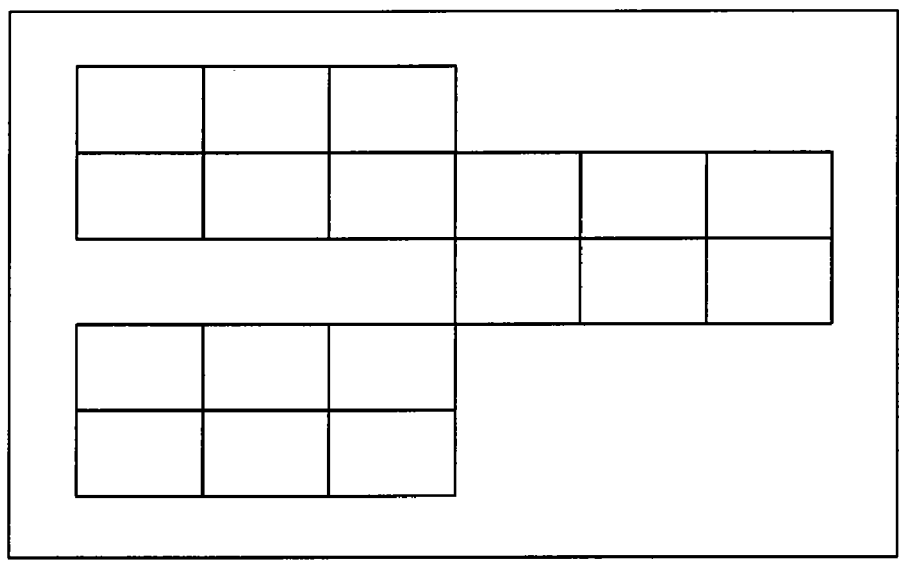
FIG. 4 are multiple image tiles which have been collected by a constellation of three satellites, showing three image mosaics with each image mosaic including 2×3 image tiles.

Referring to FIG. 4, there is shown multiple image tiles, as collected by a constellation of three satellites, for example. These multiple image tiles comprise three image mosaics, which are collected by a step and snap process. As shown, each image mosaic includes 2×3 image tiles. Thus, FIG. 4 includes 18 image tiles collected by the three satellites.

The present invention embeds an atomic clock in the image capture device that includes a focal planar array (FPA). The output data from the embedded atomic clock is digitized at the instance the exposure of the image starts by the image capture device. Stated differently, the output data from the atomic clock is digitized at the instance the photons are sensed by the pixels of the FPA. This precise image collection time is merged with the image pixel data to become part of the image tile record. This image tile record may be stored in a memory for later processing, or may be sent directly to a computer for real time processing.

Figure 5:
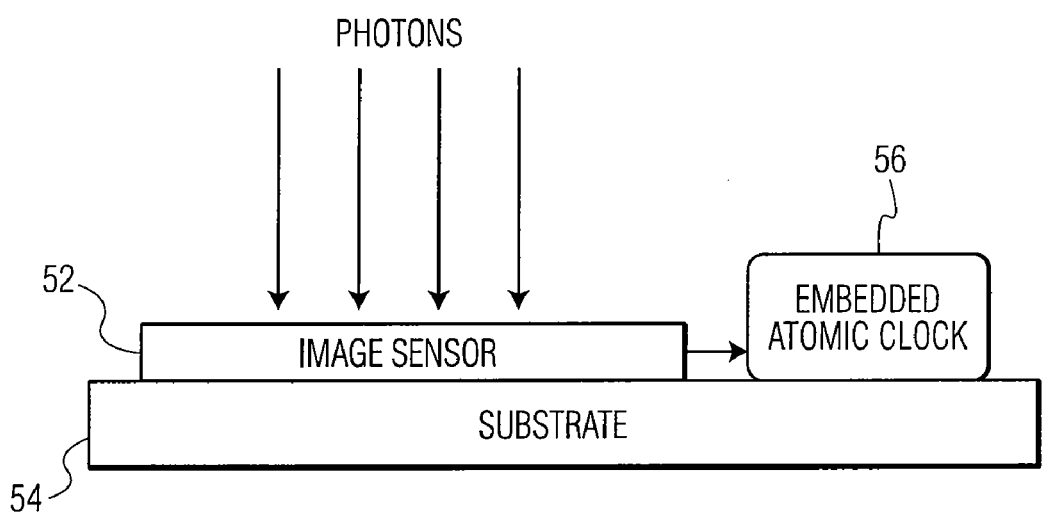
FIG. 5 is a cross sectional view of an image sensor and an embedded atomic clock disposed on a single substrate, in accordance with an embodiment of the present invention.

Referring next to FIG. 5, there is shown another embodiment of a portion of an imaging system, generally designated as 50. As shown, imaging system 50 includes imaging sensor 52 and embedded atomic clock (EAC) 56 both to disposed on a single substrate, generally designated as 54. Imaging sensor 52 may include a focal planar array (FPA) for collecting photons from an object to form an image.

Although not shown in FIG. 5, it will be understood that substrate 54 may include an amplifier to amplify the detected pixel intensities outputted from image sensor 52. It will further be understood that substrate 54 may include an analog to digital converter (ADC) for converting the pixel intensities into digital image data. Furthermore, a microcontroller/microprocessor/data formatter may also be disposed on substrate 54.

Figure 6:
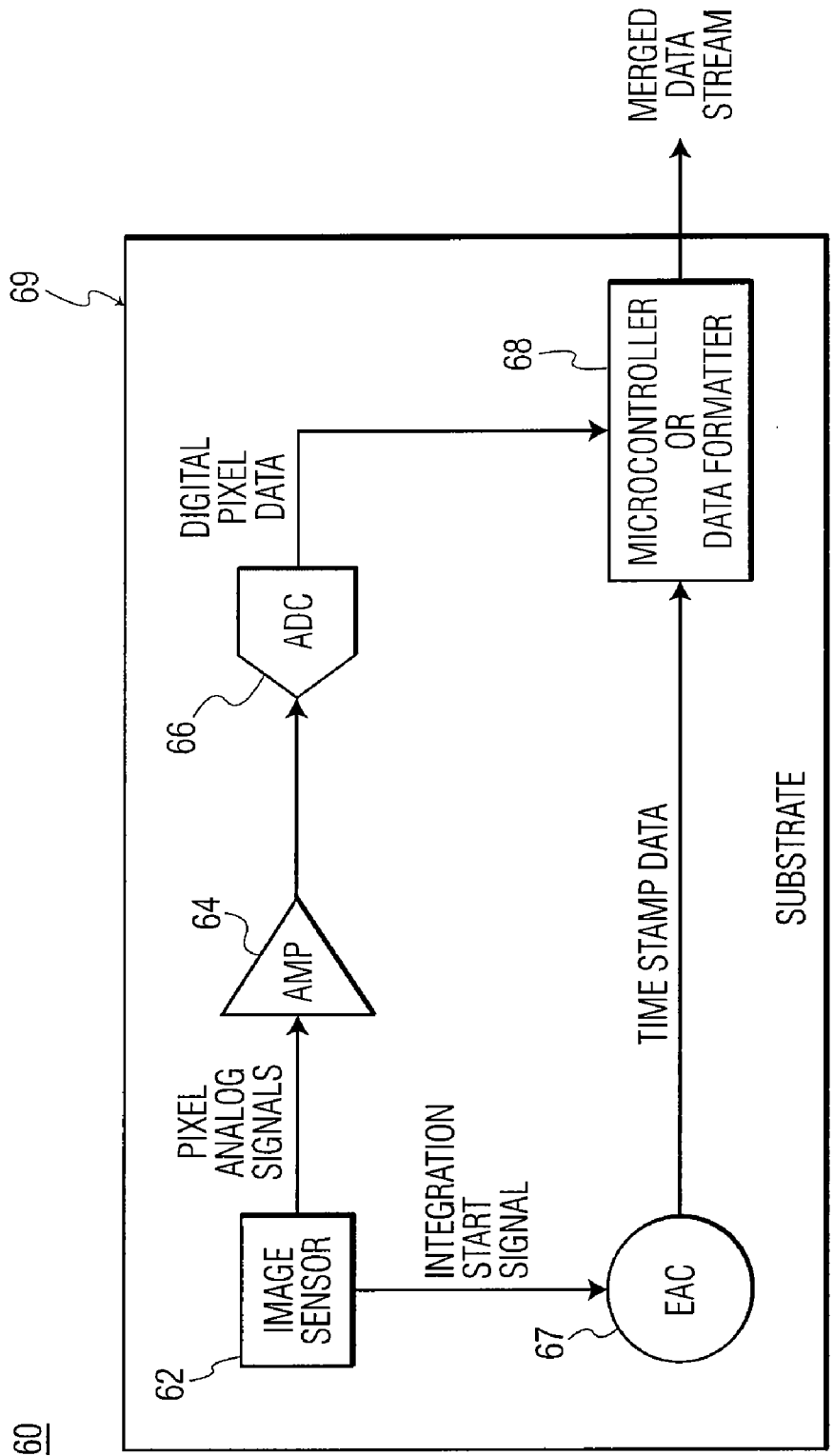
FIG. 6 is a block diagram of a portion of another imaging system that includes an imaging sensor and an embedded atomic clock, and the data from both being merged into an output data stream, in accordance with an embodiment of the present invention.

Referring now to FIG. 6, there is shown a portion of an imaging system, generally designated as 60. As shown, substrate 69 includes several elements, namely image sensor 62, amplifier 64, ADC 66, EAC 67 and microcontroller/microprocessor/data formatter 68.

Image sensor 62 receives photons from an object (not shown) and outputs pixel intensities to amplifier 64. Amplifier 64 amplifies the pixel intensities and sends the same to ADC 66. The ADC, in turn, converts the analog pixel intensities into digital pixel data. Embedded atomic clock 67 provides time stamp data to microcontroller/microprocessor/data formatter 68. The image sensor 62 provides an integration start signal to EAC 67, when the image sensor begins to collect the photons arriving from the object. Upon receiving the integration start signal, EAC 67 is triggered to provide a time stamp signal. In this manner, the time stamp signal from EAC 67 is synchronized temporally with the start of photon collection by image sensor 62. Both the digital pixel data from ADC 66 and the time stamp data from EAC 67 are combined by microcontroller/microprocessor/data formatter 68. The resulting output signal from substrate 69 is a merged data stream of time stamp data interleaved with pixel data. Such data stream may have the format shown in FIG. 3.

The sensor timing synchronization with time stamp data from the embedded atomic clock are shown in FIGS. 7(*a*)-7(*g*). As shown, time stamp data from the embedded atomic clock is read during the image frame overhead period. The frame overhead period occurs prior to reading the pixel values of a frame, as shown in FIG. 7(*a*). The frame start signal occurs, as shown in FIG. 7(*b*), during the frame overhead period.

At the beginning of the FPA's light exposure period, which is triggered by the electronic shutter signal going low, as indicated by FIG. 7(*d*), the atomic clock is read during the frame overhead period. Reading of the atomic clock is shown in FIG. 7(*e*). After exposure of the FPA to the light photons, the pixel values are read out in response to the read pixel signal, shown in FIG. 7(*f*). These pixel values are clocked by the pixel clock shown in FIG. 7(*a*). As shown, M pixel clocks are available per single line of a frame. These pixel values are converted into digital values by analog-to-digital converter 66 shown in FIG. 6. The merged data stream is shown in FIG. 7(*g*) and includes both the atomic clock time stamp and the digital pixel values.

Although only one line of a frame is shown in FIGS. 7(*a*)-7(*g*), there are multiple lines per frame (an area array of Y lines, each line having X number of pixels). A time stamp may be included for every one line of pixels, for every multiple lines of pixels, or for every one complete frame of pixels. The number of time stamps per frame depends on the desired accuracy of the time stamp as it relates to the time of arrival of the photons at the FPA.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. An imaging system comprising
    a camera including a lens and a focal planar array (FPA) for capturing at least one image frame having a plurality of sub-image frames, wherein each sub-image frame includes multiple pixel values corresponding to photonic intensities of the captured image frame, wherein the captured image frame is an image frame having a number of rows of pixel data that is the same as a number of rows of pixel data defined by the FPA,
    an embedded atomic clock (EAC) integrated in one single unit with the camera for providing time code data,
    a multiplexer for combining the multiple pixel values of each of the sub-image frames with the time code data, and
    an input/output module integrated in the one single unit for providing both, the time code data and the multiple pixel values of each of the sub-image frames as an output signal from the one single unit,
    wherein the output signal includes a sequence of a first time code data with a first sub-image frame and a second time code data with a second sub-image frame, and
    the first and second sub-image frames defined, respectively, by a first predetermined number of rows of pixel data and a second predetermined number of rows of pixel data, the first and second predetermined number of rows of pixel data forming a number of rows of pixel data that are less than or equal to the number of rows of pixel data defined by the FPA, and
    the first and second time code data correspond to times of capture of the first and second sub-image frames, respectively.

2. The imaging system of claim 1 wherein
    the input/output module includes an analog-to-digital converter (ADC) for outputting a digital data stream of both, the time code data and the multiple pixel values of each of the sub-image frames.

3. The imaging system of claim 2 wherein
    the input/output module is configured to output the digital data stream including an alternating sequence of the time code data and the multiple pixel values of each corresponding sub-image frame of the plurality of sub-image frames.

4. The imaging system of claim 1 wherein
    the EAC and the FPA are disposed within the one single unit.

5. The imaging system of claim 1 wherein
    the EAC and the FPA are disposed on one single substrate within the one single unit.

6. The imaging system of claim 1 wherein
    the EAC is a chip-scale atomic clock.

7. The imaging system of claim 1 wherein
    the time code data includes at least two time stamps, and
    the multiplexer is configured to combine the multiple pixel values of each of the sub-image frames with the at least two time stamps.

8. The imaging system of claim 1 wherein
    each of the sub-image frames includes a portion of the captured image frame, so that at least two sub-image frames comprise the captured image frame, and
    each of the sub-image frames is multiplexed with a different time code data.

9. A method of imaging an object comprising the steps of:
    (a) capturing a plurality of pixel values representing a plurality of image frames using an FPA of at least one camera;

(b) receiving multiple time stamps from an EAC,
(c) combining, in alternating sequence, (1) pixel values representing a predetermined number of rows of pixel values of the image frames captured in step (a) and (2) the multiple time stamps received in step (b); and
(d) outputting as a data stream, the combined alternating sequence of the predetermined number of rows of pixel values and time stamps;
wherein the predetermined number of rows of pixel values are less than the number of rows of pixel data defined by the FPA, and
each time stamp corresponds to the time of capture of an adjacent predetermined number of rows of pixel values within the data stream.

10. The method of claim 9 including the step of:
(e) mosaicing the pixel values representing image frames, based on the time stamps outputted in step (d).

11. The method of claim 9 including the step of:
(e) storing the data stream outputted in step (d) for subsequent mosaicing of image frames, based on the time stamps outputted in step (d).

12. The method of claim 9 wherein
step (a) includes capturing a plurality of pixel values representing a plurality of image frames using a FPA disposed in each of at least two cameras;
step (b) includes receiving multiple time stamps from an EAC disposed in each of the at least two cameras;
step (c) includes combining, in alternating sequence, (1) the pixel values representing each of the image frames captured in step (a) from a respective camera with (2) the multiple time stamps received in step (b) from the respective camera; and
step (d) includes outputting as a data stream, the combined alternating sequence of pixel values and time stamps from each of the at least two cameras.

13. The method of claim 9 including the step of:
mosaicing the pixel values representing image frames from each of the at least two cameras, based on the time stamps outputted in step (d).

\* \* \* \* \*